United States Patent [19]

Kowalski

[11] 4,431,020

[45] Feb. 14, 1984

[54] FLOW-CONTROL SYSTEM HAVING A WIDE RANGE OF FLOW-RATE CONTROL

[75] Inventor: Slawomir Kowalski, Rockaway, N.J.

[73] Assignee: Marotta Scientific Controls, Inc., Boonton, N.J.

[21] Appl. No.: 309,802

[22] Filed: Oct. 8, 1981

[51] Int. Cl.³ ............................................. F16K 31/363
[52] U.S. Cl. ..................................... 137/110; 137/486; 137/487.5
[58] Field of Search ....................... 137/110, 486, 487.5

[56] References Cited

U.S. PATENT DOCUMENTS 3,135,281  6/1964  Morgan ................................ 137/110
3,213,875 10/1965  Spence ................................ 137/110

Primary Examiner—Alan Cohan
Attorney, Agent, or Firm—Hopgood, Calimafde, Kalil, Blaustein & Judlowe

[57] ABSTRACT

The invention contemplates a system of relatively wide-range solenoid control of pressure-fluid flow from a high-pressure upstream source to a downstream load. In a first range of relatively low rates of flow, the system utilizes the solenoid to actuate a pilot valve for controlled exclusive delivery of pressure fluid to the load, via a throttling orifice; in a second range of higher rates of flow, the pressure drop across the throttling orifice becomes sufficiently great to enable pilot-delivery pressure, upstream from the throttling orifice, to open a main-valve line from the source to the load. The arrangement is such that solenoid-actuating force variation within the first range produces a first characteristic of flow-rate delivery to the load, and is also such that solenoid-actuating force variation beyond the first range produces a second and steeper characteristic of flow-rate delivery to the load.

9 Claims, 3 Drawing Figures

FLOW-CONTROL SYSTEM HAVING A WIDE RANGE OF FLOW-RATE CONTROL

BACKGROUND OF THE INVENTION

The invention relates to a valve system for control of the rate of fluid flow, and in particular the invention relates to pilot operation of a main valve for such purposes.

In the past, it has been customary to rely upon a pressure-operated main valve to determine the range of flow rate for controlled delivery of pressure fluid, from a source to a given load, and a pilot valve has been associated with the main valve, analogous to a control amplifier, in order to develop control of actuating-pressure delivery to the main valve. In short, the range of the main valve was the range of the system, and the fidelity of system response suffered at the low-flow end of the range of the system.

BRIEF STATEMENT OF THE INVENTION

It is an object of the invention to provide an improved flow-control system of the character indicated, operable with greater fidelity and over a greater range than heretofore.

Another object is to meet the foregoing object with particularly great fidelity at the low end of the range of flow rates of the system.

It is also an object to meet the above objects in a system of the character indicated wherein pilot-valve actuating force determines working-fluid flow throughout the range of flow rates of the system and regardless of pressure changes in the supply of working fluid.

The invention achieves the above objects and provides certain further features in a flow-control system utilizing a solenoid-operated pilot valve, in a first operating range, for controlled exclusive delivery of pressure fluid from an upstream source to a downstream load, delivery from the pilot valve being via a throttling orifice. In a second range of higher rates of flow, the pressure drop across the throttling orifice becomes sufficiently great to enable pilot-delivery pressure, upstream from the throttling orifice, to open a main-valve line from the source to the load. The arrangement is such that solenoid-actuating force variation within the first range produces a first characteristic of flow-rate delivery to the load, and is also such that solenoid-actuating force variation beyond the first range produces a second and steeper characteristic of flow-rate delivery to the load.

DETAILED DESCRIPTION

The invention will be illustratively described in detail in conjunction with the accompanying drawings, in which.

Figure 1:
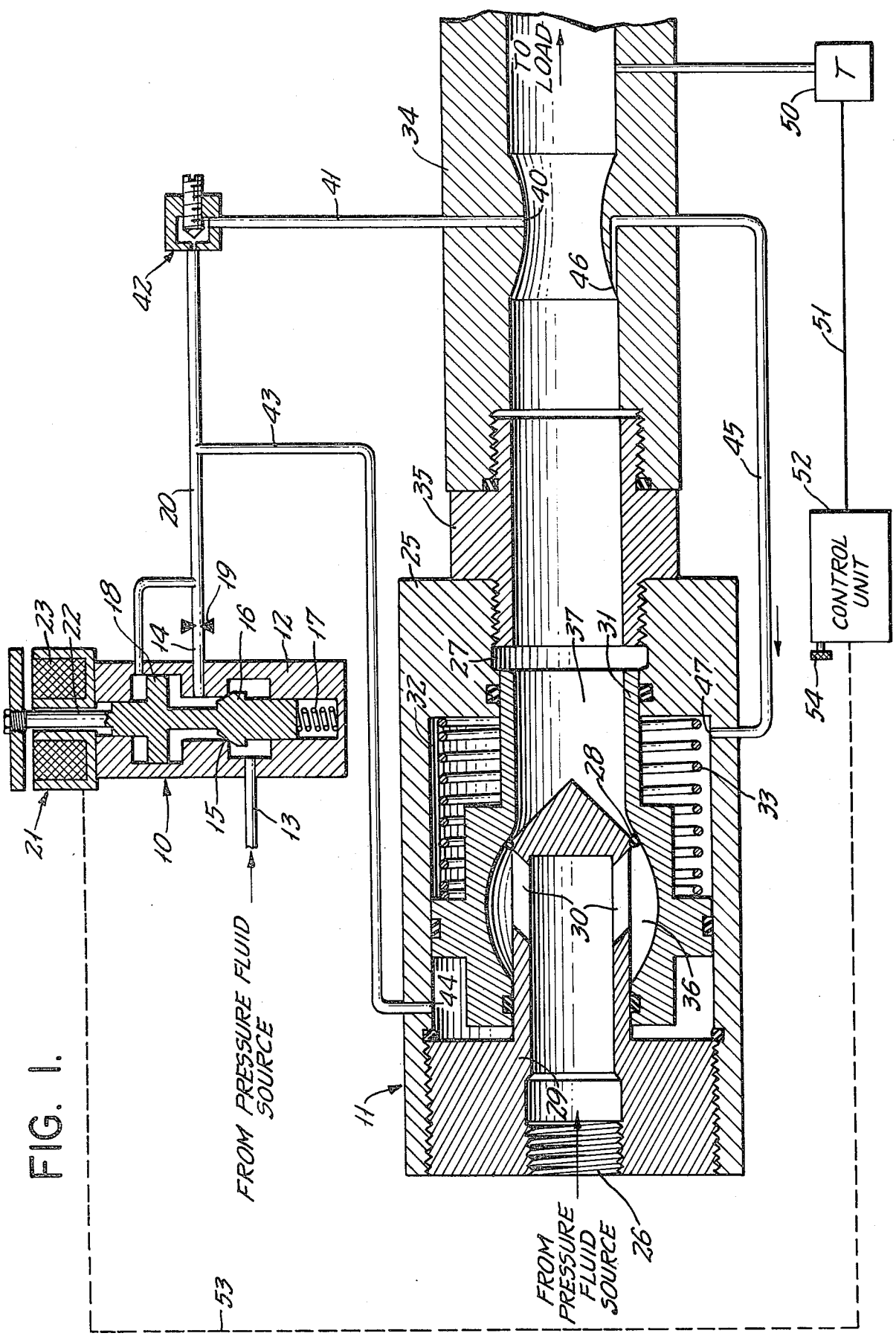
FIG. 1 is a schematic diagram of a fluid-flow control system of the invention, certain valve parts thereof being shown in longitudinal section.

In FIG. 1, legends indicate that both a pilot valve 10 and a main valve 11 are connected to a pressure-fluid source, i.e., they may be connected to the same source of working fluid. Both valves 10–11 are also connected for delivery of working fluid to the same load, such delivery being shown by legend at ultimate exit from the main-valve part of the system. The pilot valve 10 is solenoid-operated and may be of the variety disclosed in U.S. Pat. No. 3,534,770, and the main-valve is pressure-operated and may be of the in-line variety disclosed in U.S. Pat. No. 3,590,847.

More specifically, pilot valve 10 comprises a body 12 having a passage between an inlet port 13 and an outlet port 14, and a seat 15 between these ports. A pilot-valve member 16 is guided within body 12 for coaction with seat 15, being resiliently loaded by means 17 in the valve-closing direction. An integrally formed end of valve member 16 is a balancing piston 18, the lower surface of which is exposed to fluid pressure existing in the region between seat 15 and an orifice 19 in the connection of an outlet line 20 from port 14; the upper surface of piston 18 is subjected to pressure existing at the downstream side of orifice 19. A solenoid actuator 21 includes a stem 22 which exerts downward (valve-opening) force on valve-member 16 in proportion to the level of excitation current supplied to the winding 23 thereof.

Main valve 11 comprises an elongate body 25 having a passage between an inlet port 26 and an outlet port 27, and a seat 28 therebetween is at the base of a conical downstream end of a tubular seat-support member 29 having lateral ports 30 upstream from seat 28. A main-valve member 31 is a characterized sleeve having a first sealed sliding engagement along a cylindrical body bore 32 and a second sealed sliding engagement along that part of the cylindrical exterior of support member 29 as is upstream from ports 30. A spring 33 loads valve-member 31 in the valve-closing direction; this spring is preferably characterized by a high rate, whereby "hunting" is avoided in valve operation. The outlet line from port 27 to the load includes a flow restriction which is shown as a venturi 34, and a nipple 35 in this outlet line provides a flow-stabilizing offset of the throat of venturi 34, with respect to the main-valve seat 28.

The inner-surface characterizing of valve-member sleeve 31 is such as to smoothly develop transition between a substantially tangential surface of main-valve closing contact with seat 28 and an enlarged circumferentially continuous manifolding cavity 36 for upstream accommodation of working fluid discharged via ports 30 whenever the main valve is open; downstream from the region of seat coaction, the inner surface of sleeve 31 makes smooth transition to a cylindrical discharge bore 37 that is non-restrictive to flow. The outer-surface characterizing of the valve-member sleeve 31 is such as to provide a land for location of spring 33 and to establish desired upstream-facing and down-stream facing piston areas to be subjected to actuating and balancing fluid pressures, as will become clear.

The throat of venturi 34 is its low-pressure region, for main-valve outlet flow therethrough, and it is by discharge via a port 40 to this throat that I make a connection 41 for continuous pilot-valve outlet-flow discharge to the load, such discharge being via a throttling orifice, e.g., an adjustable needle valve 42, interposed between lines 20 and 41. A line 43 connects the pilot-valve outlet line 20 to a port 44 at the upstream end of the main-valve body cavity 32, for application of pilot-outlet pressure to the piston-characterized outer surface of valve-member sleeve 31. Finally, a connection line 45 from an upstream venturi port 46 to a port 47 at the downstream end of bore 32 enables use of venturi-inlet pressure for balancing the piston-characterized outer surface of the valve-member sleeve 31.

Figure 3:
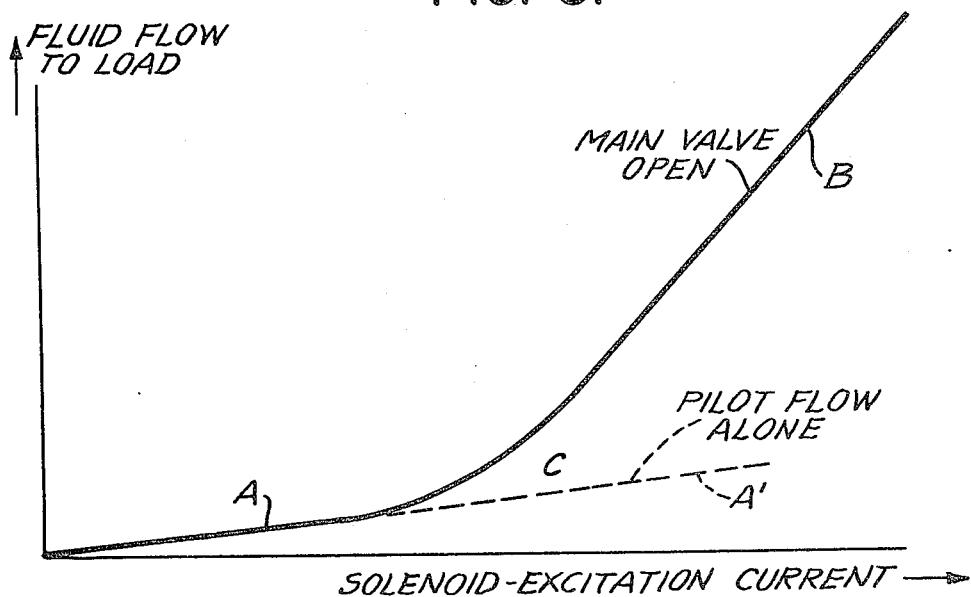
FIG. 3 is a graph depicting a flow characteristic of the system of FIG. 1 or FIG. 2.

In operation, a given level of excitation current to solenoid winding 23 will apply a given downward force to pilot-valve member 16, and the constant monitoring of pressure on opposite sides of orifice 19 enables the pressure difference to displace valve member 16 as necessary to assure the correct pilot-valve outlet flow in line 20, regardless of changes in supply pressure at inlet 13. As long as this solenoid-developed force is at a level within a first range of relatively low outlet flows in line 20, the pilot-controlled flow will pass to the load exclusively via line 41 and the venturi-throat port 40. For flows in this first range, the pressure drop across throttling orifice 42 will be insufficient to provide enough pressure in line 43 to unseat the main-valve sleeve 31. This condition produces an operating characteristic of relatively low slope, denoted A in FIG. 3.

When solenoid 21 is so excited that pilot-valve outlet flow in line 41 creates a sufficient pressure drop across throttling orifice 42, the pressure in line 43 will cause sleeve 31 to displace against action of spring 33, thus opening the main valve and thus also superposing the steeper flow-control characteristic of the main valve upon that of the pilot valve. The result is a much steeper characteristic, of delivery to the load, as a function of solenoid excitation, the same being depicted at B in FIG. 3, and the difference between the pilot-valve characteristic A' alone and curve B being attributable solely to main-valve action in proportional response to solenoid excitation. The knee region C of onset of main-valve action may be adjustably selected, in terms of the solenoid current at which it will occur, by throttling adjustment at 42.

In an illustrative automatic employment of the described flow-control system, an electrical transducer device 50 is connected at a location downstream from the restriction 34. Such a transducer may be of the variety producing an electrical output signal in a line 51 in accordance with the instantaneously sensed pressure of fluid delivery to the load. An electrical control unit 52 may have an input signal connection from transducer 50 and an output signal connection 53 to solenoid 23; control unit 52 may also have means such as a manually operable knob 54 for selective establishment of a desired level of an electrical quantity against which level the transducer output signal is comparatively evaluated, to produce the instantaneously operative solenoid-excitation signal in line 53, it being understood that directional sense of change in transducer-output signal is appropriately interpreted in terms of directional sense of the change in solenoid-excitation current needed to stabilize the sensed pressure at the level set by adjustment at 54.

What has been said as to use of the control unit 52 in conjunction with transducer 50 will be understood to be applicable for the sensing and control of quantities other than pressure, as for example, a pressure-difference measurement across an orifice, to monitor and control flow rate to the load. Equally, the transducer 50 to sense flow rate may be other than a sensor of pressure difference; for example, it may comprise a turbine-like wheel in the path of flow, connected to run a d-c generator, for development of the transducer output signal in line 51.

Figure 2:
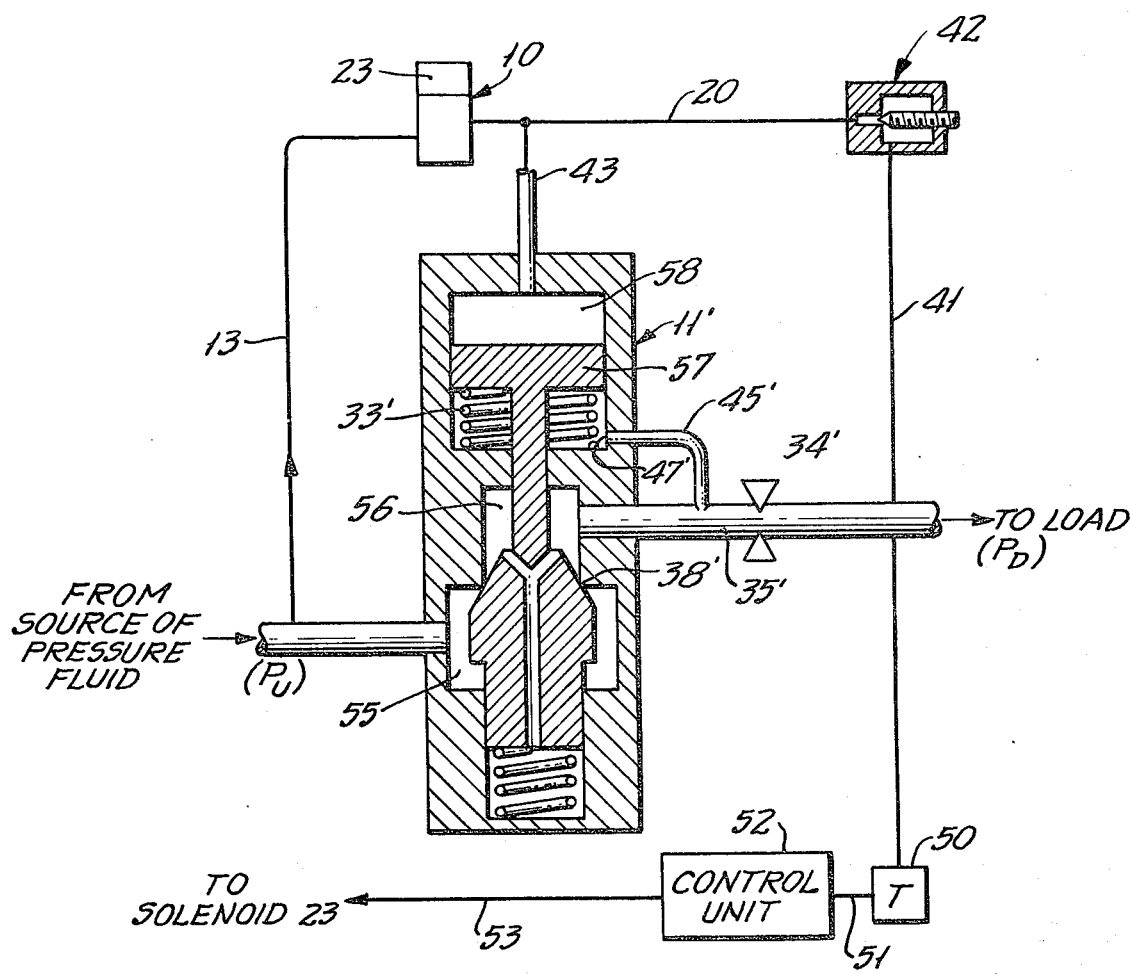
FIG. 2 is a more simplified schematic diagram to show a modification.

The modified circuit of FIG. 2 serves primarily to illustrate that other components may be used in place of some of those specifically described in connection with FIG. 1. Pilot valve 10 and its solenoid actuator 23 are still preferably as described in FIG. 1, and other corresponding components are given the same reference numbers. In place of venturi 34, however, a flow-monitoring orifice 34' is shown in the outlet line connection 35' to the main valve 11'; this being the case, the low-pressure region for reception of pilot-valve outlet flow in line 41 is downstream from orifice 34'. In place of the in-line type of main valve shown in FIG. 1, the main valve 11' of FIG. 2 is a more conventional piston-operated valve, wherein the valve seat 38' divides the main valve body chamber between a lower inlet chamber 55 and an upper outlet chamber. Actuating pressure available from line 43 is applied over the head-end face of piston 57, and against the preload of a high-rate spring 33' and the balancing pressure load on the tail-end face of the piston, the latter pressure being available via a line connection 45' from the high-pressure side of orifice 34' to a downstream port 47' in the body cylinder 58 in which piston 57 is movable.

The described apparatus will be seen to achieve all stated objects, and to be applicable to the controlled handling of a liquid or a gas as the working fluid. Also, it will be understood that the reference to automatic control of flow in accordance with sensed downstream pressure, or in accordance with sensed downstream flow, are purely illustrative, in that sensing of another quantity or an evaluated combination of sensed load-related quantities may be desired and applicable, depending upon individual needs of a particular load system.

While the invention has been described in detail for preferred and illustrative embodiments, it will be understood that modifications may be made without departing from the scope of the invention.

What is claimed is:

1. In combination, a pilot valve and a main valve for controlling delivery of pressure fluid from an upstream source to a downstream load;

said pilot valve comprising a pilot-valve body with a passage between an inlet connected to said source and an outlet-line connection and having a valve-member seat therebetween, a flow restriction between said seat and said outlet-line connection, a pilot-valve member coacting with said seat, solenoid-operated means for applying to said pilot-valve member a valve-opening force proportional to solenoid-excitation, and fluid-pressure operated means differentially responsive to pressure on opposite sides of said flow restriction for establishing a constant delivery of pilot-valve outlet flow in said outlet-line connection for a given solenoid excitation and substantially independent of changes in source pressure;

said main valve comprising a main-valve body having a passage between an inlet connected to said source and an outlet-line connection to said load and having a valve-member seat therebetween, a flow restriction in said outlet-line connection, whereby near said last-mentioned restriction there exists a first region of relatively low-pressure main-valve outlet fluid flow and a second region of relatively high-pressure main-valve outlet fluid flow upstream from said main-valve outlet flow restriction, fluid-pressure responsive means for operatively positioning said main-valve member and differentially responsive to pressure on one side for developing main-valve opening force and on the other side for developing a balancing force in opposition to the opening force, and a connection from said second region to said other side for developing balancing force from main-valve outlet pressure sampled from said main-valve outlet restriction; first means including a throttling orifice connecting the pilot-valve outlet-line connection to said first region, and second means connecting the pilot-valve outlet-line connection to said one side of the fluid-pressure responsive operating means of said main valve; whereby, depending upon the excitation of said solenoid, pilot-valve flow will be delivered to said load essentially with a first characteristic of proportionality to solenoid excitation; and further whereby main-valve flow will be additionally delivered to said load essentially with a second and steeper characteristic of proportionality to solenoid excitation, the pilot-valve flow rate at which said second characteristic becomes operative being a function of the setting of said throttling orifice.

2. The combination of claim 1, in which said main valve is of the in-line variety, wherein the main-valve passage, the main-valve member and the main-valve seat are disposed on an elongate axis of flow.

3. The combination of claim 1, in which said main-valve outlet-line connection includes a flow-stabilizing connection for longitudinally offsetting the flow restriction of said main-valve outlet-line connection with respect to said main-valve seat.

4. The combination of claim 1, in which the flow restriction of said main-valve outlet-line connection is a venturi, and in which said first region is at the throat of the venturi.

5. The combination of claim 1, in which the flow restriction of said main-valve outlet-line connection is a restrictive orifice, and in which said first region is on the downstream side of said last-mentioned restrictive orifice.

6. The combination of claim 1, and including a pressure transducer connected to sense pressure on the load side of the flow restriction of said main-valve outlet-line connection, said transducer producing an electrical signal in accordance with sensed pressure, an electrical control unit having an input connection to said transducer and having an output connection to said solenoid and including means for selecting an electrical quantity against which transducer output is compared to develop an output signal to said solenoid.

7. The combination of claim 1, and including a fluid-flow transducer connected to sense fluid-flow on the load side of the flow restriction of said main-valve outlet-line connection, said transducer producing an electrical signal in accordance with sensed fluid-flow, an electrical control unit having an input connection to said transducer and having an output connection to said solenoid and including means for selecting an electrical quantity against which transducer output is compared to develop an output signal to said solenoid.

8. The combination of claim 1, in which said throttling orifice is selectively adjustable.

9. The combination of claim 1, in which said main valve includes a high-rate spring preloading said main-valve member in the closing direction.

* * * * *